(12) United States Patent
Lee et al.

(10) Patent No.: US 9,052,818 B2
(45) Date of Patent: Jun. 9, 2015

(54) METHOD FOR PROVIDING GRAPHICAL USER INTERFACE (GUI) USING DIVIDED SCREEN AND MULTIMEDIA DEVICE USING THE SAME

(75) Inventors: Soo-hyun Lee, Goyang-si (KR); Eun-kyung Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1466 days.

(21) Appl. No.: 12/193,967

(22) Filed: Aug. 19, 2008

(65) Prior Publication Data

US 2009/0193351 A1   Jul. 30, 2009

(30) Foreign Application Priority Data

Jan. 29, 2008 (KR) ........................ 10-2008-0009110

(51) Int. Cl.
| | | |
|---|---|---|
| *G06F 3/048* | (2013.01) | |
| *G06F 3/0488* | (2013.01) | |
| *G06F 3/0482* | (2013.01) | |
| *G06F 3/0486* | (2013.01) | |
| *G06F 3/0481* | (2013.01) | |

(52) U.S. Cl.
CPC .......... *G06F 3/04883* (2013.01); *G06F 3/0481* (2013.01); *G06F 3/0482* (2013.01); *G06F 3/0486* (2013.01); *G06F 2203/04803* (2013.01)

(58) Field of Classification Search
CPC ............................... G06F 3/048; G06F 3/0481
USPC .................. 715/724, 727, 781, 855, 769, 863
See application file for complete search history.

(56) References Cited

U.S. PATENT DOCUMENTS

| | | | | |
|---|---|---|---|---|
| 5,305,435 A | * | 4/1994 | Bronson ........................ 715/777 |
| 5,583,984 A | * | 12/1996 | Conrad et al. ................ 715/769 |
| 5,657,049 A | * | 8/1997 | Ludolph et al. ............... 715/856 |
| 5,748,896 A | * | 5/1998 | Daly et al. .................... 709/223 |
| 5,897,650 A | * | 4/1999 | Nakajima et al. ............. 715/202 |
| 6,043,817 A | | 3/2000 | Bolnick et al. |
| 6,097,389 A | | 8/2000 | Morris et al. |
| 6,104,391 A | | 8/2000 | Johnston, Jr. et al. |
| 6,392,672 B1 | | 5/2002 | Kulik |
| 7,680,824 B2 | * | 3/2010 | Plastina et al. ................ 707/737 |
| 8,161,400 B2 | | 4/2012 | Kwon |
| 2005/0060653 A1 | * | 3/2005 | Fukase et al. ................. 715/724 |

(Continued)

FOREIGN PATENT DOCUMENTS

| | | |
|---|---|---|
| CN | 1885985 A | 12/2006 |
| KR | 2000-73258 | 12/2000 |

(Continued)

OTHER PUBLICATIONS

Search Report and Written Opinion issued from the International Searching Authority on Jan. 12, 2009 with respect to International Application No. PCT/KR2008/003752.

*Primary Examiner* — William Titcomb
(74) *Attorney, Agent, or Firm* — Jefferson IP Law, LLP

(57) ABSTRACT

A method of providing a graphical user interface (GUI) using divided screens, and a multimedia device using the same, the method including: displaying a plurality of items on a first screen on a display of the device; displaying a plurality of lists on a second screen on the display; and adding an item selected by a user from among the plurality of items on the first screen to a list selected by the user from among the plurality of lists on the second screen. Accordingly, the user can manage items and lists more intuitively and conveniently.

60 Claims, 27 Drawing Sheets

(56) References Cited

U.S. PATENT DOCUMENTS

| | | |
|---|---|---|
| 2005/0076307 A1* | 4/2005 | Robbin .................. 715/792 |
| 2006/0195521 A1* | 8/2006 | New et al. .............. 709/204 |
| 2006/0195789 A1* | 8/2006 | Rogers et al. .......... 715/727 |
| 2007/0036346 A1 | 2/2007 | Kwon |
| 2008/0092046 A1* | 4/2008 | Bae ........................ 715/716 |
| 2008/0148152 A1* | 6/2008 | Blinnikka et al. ...... 715/719 |
| 2008/0155057 A1* | 6/2008 | Khedouri et al. ....... 709/217 |
| 2008/0165153 A1* | 7/2008 | Platzer et al. .......... 345/173 |
| 2008/0195961 A1* | 8/2008 | Bae et al. ............... 715/769 |
| 2009/0037449 A1* | 2/2009 | Fagans et al. .......... 707/101 |
| 2009/0070339 A1* | 3/2009 | Cho et al. ............... 707/10 |
| 2009/0187842 A1* | 7/2009 | Collins et al. .......... 715/769 |

FOREIGN PATENT DOCUMENTS

| | | |
|---|---|---|
| KR | 2004-60018 | 7/2004 |
| KR | 2007-15775 | 2/2007 |
| WO | WO 2006/024623 | 3/2006 |

* cited by examiner

METHOD FOR PROVIDING GRAPHICAL USER INTERFACE (GUI) USING DIVIDED SCREEN AND MULTIMEDIA DEVICE USING THE SAME

CROSS-REFERENCE TO RELATED APPLICATION

This application claims the benefit of Korean Patent Application No. 2008-9110, filed Jan. 29, 2008, in the Korean Intellectual Property Office, the disclosure of which is incorporated herein by reference.

BACKGROUND OF THE INVENTION

1. Field of the Invention

Aspects of the present invention relate to a method of providing a graphical user interface (GUI) using divided screens and a multimedia device using the same, and more particularly, to a method of providing a GUI that is used to operate a multimedia device.

2. Description of the Related Art

Developments in communication and storage device technology have enabled the storage of vast amounts of content on storage media. Due to the increased amounts of content being stored in multimedia devices, a user may often want to list content he or she desires to play back. Recently, the range of portable multimedia devices capable of playing back content has rapidly increased. Since multimedia devices provide such a variety of functions, methods of using multimedia have inevitably become more complicated, and the number of menu items that must be provided on a screen for the user has also dramatically increased.

However, due to a small screen size of portable multiple devices, an appropriate interface to enable a user to use large, complex menus more efficiently, while providing superior visual effects, is required. Therefore, there is a need for methods of providing a user with an interface enabling the user to edit lists of content and menus more intuitively and efficiently, while providing superior visual effects.

SUMMARY OF THE INVENTION

Aspects of the present invention relate to a method of providing a graphical user interface (GUI) using divided screens whereby a user may organize lists more efficiently and a multimedia device using the same.

According to an aspect of the present invention, there is provided a method of providing a graphical user interface (GUI) on a display, the method including: displaying a plurality of items on a first screen on the display; displaying a plurality of lists on a second screen on the display; and adding an item selected by a user from among the plurality of items on the first screen to a list selected by the user from among the plurality of lists on the second screen.

The first screen may be displayed on a first part of the display and the second screen may be simultaneously displayed on a second part of the display, different from the first part.

The adding of the selected item may include adding the selected item of the first screen when the selected item is dragged and dropped from the first screen onto the selected list of the second screen by the user.

The display may be a touch screen showing the first screen and the second screen.

The dragging and dropping operation may be performed using an input unit that is provided separately from the display showing the first screen and the second screen.

The plurality of items may include moving image content, still image content, music content, text content, one or more menu items, and/or one or more widget items.

The method may further include displaying groups of items on the first screen, and adding a group selected by the user from among the groups on the first screen to a list selected by the user from among the plurality of lists on the second screen.

The groups of items may include groups classified according to shared characteristics of the items therein, groups classified according to persons associated with the items therein, and/or groups classified according to objects associated with the items therein.

The plurality of items may include music files, and the groups of music files may include groups classified according to genre, groups classified according to artist, and/or groups classified according to album.

The method may further include: removing the plurality of items from the first screen if a command to execute an item is input; displaying an executing screen to execute the selected item on the first screen; and adding the item of the executing screen to a list that the user selects from among the plurality of lists on the second screen.

The adding of the item of the executing screen may include adding the item of the executing screen to the selected list if a location of the executing screen is dragged and dropped to the selected list on the second screen.

The plurality of items may include multimedia content, and the executing screen on the first screen may be a multimedia content player.

The plurality of items may include multimedia content, and the first list may include reference values to be used to access the multimedia content displayed on the first screen.

Each reference value may include addresses of locations at which the content is stored, and/or addresses of a location where a content item to be first read is when the content is accessed.

An item on the first screen may belong to both a first list and a second list on the second screen.

The plurality of items may include multimedia content, and the first list and the second list may each include a reference value to be used to access the item.

The plurality of items on the first screen may belong to a first list of the plurality lists on the second screen.

The method may further include deleting an item from the first screen if the user drags the item to an outside of the first screen, and deleting the dragged item from the first list.

The plurality of items may be arranged on the first screen in a format different from that of the plurality of lists displayed on the second screen.

The plurality of items on the first screen may be stored in a storage medium, and the method may further include deleting an item from the storage medium if the user drags the item to an outside of the first screen.

The method may further include deleting the dragged item from a list to which the dragged item belongs.

The deleting of the dragged item may include deleting a reference value that is used to access the dragged item from the list to which the dragged item belongs.

The method may further include deleting a reference value that is used to access the dragged item from a plurality of lists to which the dragged item belongs.

The method may further include deleting a list selected by the user from the second screen.

The list selected by the user may be a list dragged outside of the second screen by the user, or a list selected by the user with reference to a screen that is provided to the user in order to inform the user of lists that are used less frequently.

According to another aspect of the present invention, there is provided a multimedia apparatus including: a generation unit to generate a graphical user interface (GUI); and a control unit to control the generation unit to generate the GUI such that a plurality of items are displayed on a first screen of a display of the multimedia apparatus, and a plurality of lists are displayed on a second screen, and an item selected by a user from among the plurality of items on the first screen is added to a list selected by the user from among the plurality of lists on the second screen.

The control unit may control the selected item to be added to the selected list when a user drags and drops the selected item from the first screen onto the selected list of the second screen.

The plurality of items may include moving image content, still image content, music content, text content, one or more menu items, and/or one or more widget items.

The control unit may control the generation unit to generate the GUI such that groups of items are displayed on the first screen, and items from a group selected by the user from among the groups on the first screen is added to a list selected by the user from among the plurality of lists on the second screen.

An item on the first screen may belong to both a first list and a second list on the second screen.

According to yet another aspect of the present invention, there is provided a method of providing a GUI, the method including: displaying items belonging to a list on a first screen of a display; displaying items on a second screen of the display; moving an item from the second screen to the first screen when the item is dragged and dropped from the first screen to the second screen; and adding the moved item to the list.

The dragged item may be moved to a location on the first screen to which the dragged item is dropped onto the first screen.

The display may be a touch screen displaying the first screen and the second screen.

The dragging and dropping may be performed using an input unit that is provided separately from the display showing the first screen and the second screen.

The plurality of items on the second screen may not belong to the list on the first screen.

The method may further include moving an item from the first screen to the second screen, and deleting the moved item from the list.

The method may further include moving an item from a location of the first screen to a dropped location on the first screen.

The method may further include displaying text indicating an area in which an item can be moved on the area of the first screen to which an item on the second screen is able to be moved.

The displaying of the items on the second screen may be performed if the user touches a point on the touch screen displaying the first screen and the second screen or if the user drags an area on the touch screen.

The method may further include removing the items from the second screen if the user touches a point on the touch screen displaying the first screen and the second screen or if the user drags an area on the touch screen.

The plurality of items may be moving image content, still image content, music content, text content, one or more menu items, and/or one or more widget items.

The method may further include displaying text content on the first screen, and displaying a portion of the text content on the second screen.

The portion of the text may be selected by the user by dragging and dropping the portion of the text from the first screen onto the second screen.

According to still another aspect of the present invention, there is provided a multimedia apparatus including: a generation unit to generate a graphical use interface (GUI); and a control unit to control the generation unit to generate the GUI such that items belonging to a list are displayed on a first screen on a display of the multimedia apparatus, items are displayed on a second screen on the display, and an item on the second screen that is dragged and dropped onto the first screen by a user is moved to the first screen, and added to the list.

The control unit may control the generation unit to generate the GUI such that the dragged item is moved to a dropped location on the first screen.

The items on the second screen may not belong to the list.

The control unit may control the generation unit to generate the GUI such that an item on the first screen that is dragged and dropped to the second screen by the user is moved to the second screen and deleted from the list.

According to another aspect of the present invention, there is provided a method of editing a graphical user interface (GUI) on a display of a portable multimedia apparatus, the method including: displaying a plurality of main menu items of a main menu on a first editing screen on the display; displaying a plurality of extra menu items, not on the main menu, on a second editing screen on the display, simultaneous to the displaying of the first editing screen; and adding an extra menu item selected by a user from among the plurality of extra menu items on the second screen to the main menu when the user moves the selected extra menu item from the second screen to the first screen.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
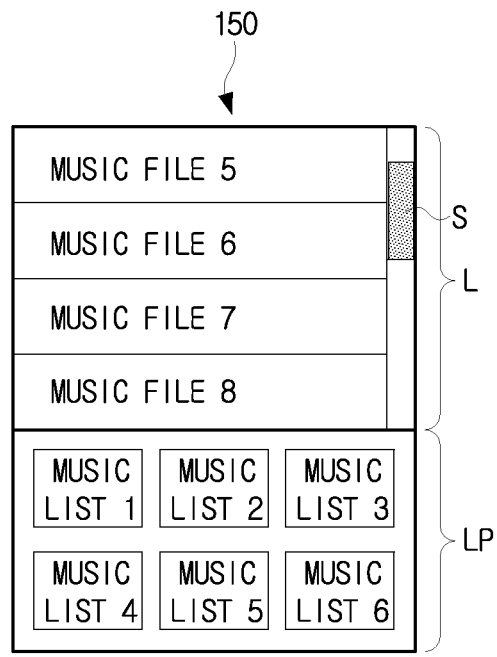
FIGS. 1A to 1G are conceptual views of a graphical user interface (GUI) that enables a user to organize lists using divided screens according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIGS. 1A to 1G illustrate a graphical user interface (GUI) to enable a user to manage lists using divided screens according to an embodiment of the present invention. Referring to FIG. 1A, a touch screen 150 of a multimedia device is divided into two sections that respectively display a music list screen L and a music list pool screen LP. The music list screen L displays a list of music content items stored in a storage medium of the multimedia device. For example, the music list screen L shown in FIG. 1A displays music content items ("music file 5," "music file 6," "music file 7," and "music file 8") from among music content items stored in the storage medium.

If a user scrolls down using a scroll bar S displayed on a side of the music list screen L, music content items that follow "music file 8" (such as "music file 9," "music file 10," "music file 11," etc.) may appear on the music list screen L. Alternatively, if the user scrolls up using the scroll bar S, music content items that precede "music file 5" (such as "music file 4," "music file 3," "music file 2," etc.) may appear on the music list screen L.

The music list pool screen LP displays music lists that have previously been generated (such as "music list 1," "music list 2," "music list 3," . . . , "music list 6,"), as shown in FIG. 1A. The music lists in the music list pool screen LP may be generated by the user, may have been originally generated as default lists regardless of the user's intention, or may be generated from other sources. While six music lists are displayed on the music list pool screen LP of FIG. 1A, it is understood that the number of music lists is not limited thereto. That is, fewer than or more than six music lists may be displayed on the music list pool screen LP. Furthermore, a scroll bar S may be added to the music list pool screen LP in the same manner as in the music list screen L in order to scroll through the music lists.

As illustrated, the music content items are arranged vertically on the music list screen L, while the music lists are arranged horizontally in the music list pool screen LP, so that there is a difference in arrangement between the two screens L and LP. However, this is merely illustrative for convenience of description, and it is understood that according to other aspects, the music content items and the music lists may have the same arrangement or the music content items may be arranged horizontally while the music lists are arranged vertically. That is, the arrangement of the music list screen L and the music list pool screen LP shown in FIG. 1A are only exemplary, and arrangements other than that shown in FIG. 1A may thus be employed.

Figure 1B:
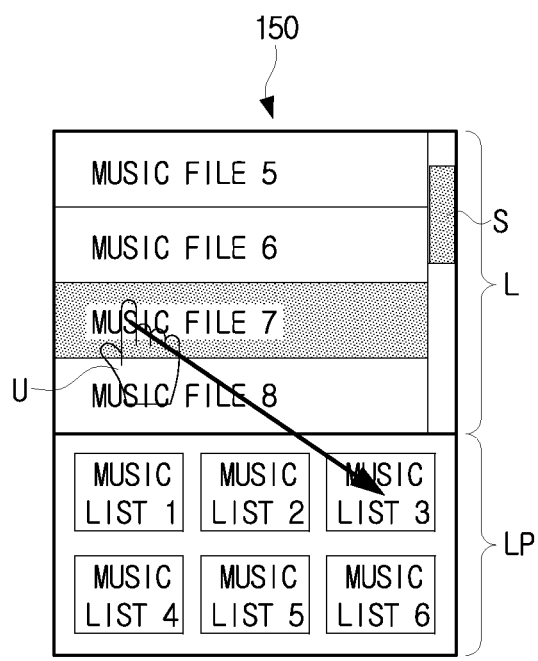
Figure 1C:
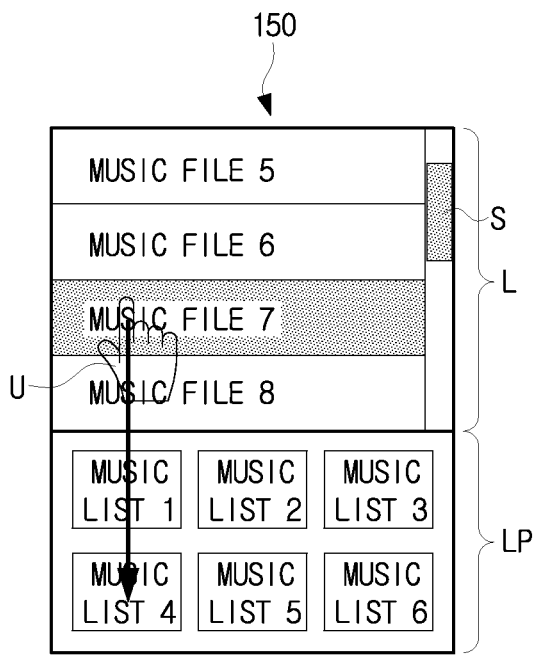

A user may add a desired music content item from among the music content items of the music list screen L to a desired music list among the music lists of the music list pool screen LP by a dragging and dropping operation. Specifically, if the user drags and drops a desired music content item onto a desired music list, the dragged music content item is added to the music list. For example, a user U may drag and drop "music file 7" onto "music list 3," as shown in FIG. 1B, in order to add "music file 7" to "music list 3." Furthermore, a certain music content item may be added to several music lists. For example, after dragging and dropping "music file 7" onto "music list 3," "music file 7" is also added to "music list 4" if the user U drags and drops "music file 7" onto "music list 4," as shown in FIG. 1C.

The music list includes information regarding the music content items belonging to the music list. That is, each music list does not include the files of music content items, but includes reference values or metadata used to access the music content items. The reference values are inherent values of the music content items, such as addresses of the storage media where the music content items are stored, or an address of the storage medium to be read first in order to access a music content item. For example, the address of the storage medium to be read first in order to access a music content item may be an address of a storage medium including a file allocation table (FAT) regarding a music content item.

As described above, a plurality of music lists may share one or more of the same music content items. The reference values of the shared music content items are listed in all the music lists including the shared music content items, which will be explained in detail with reference to FIG. 2.

Figure 1D:
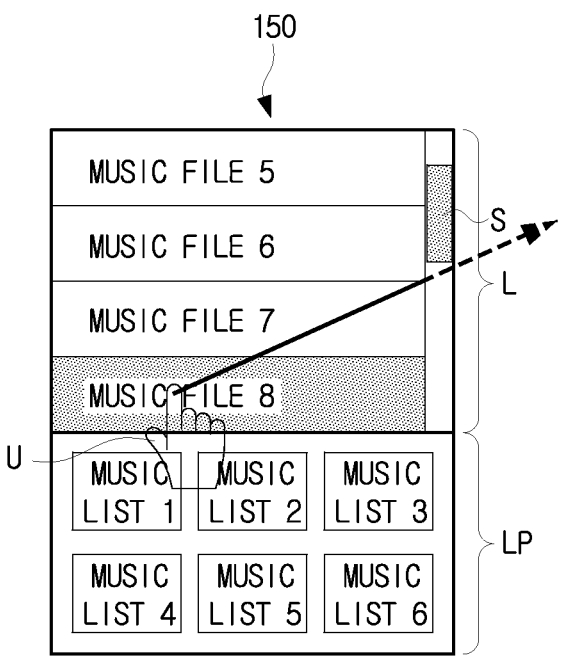
Figure 1E:
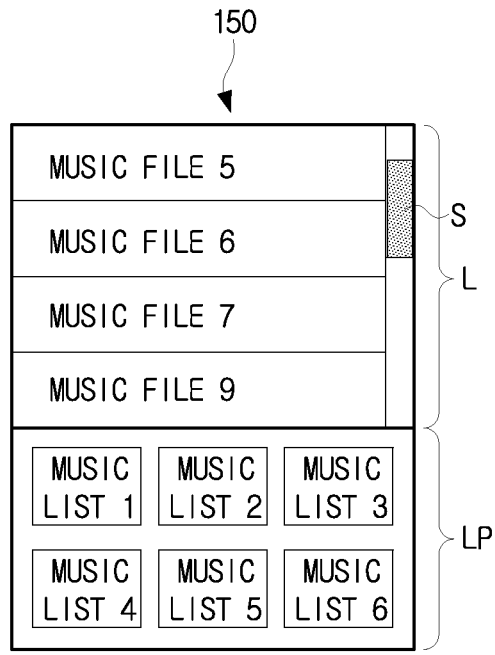
Figure 1F:
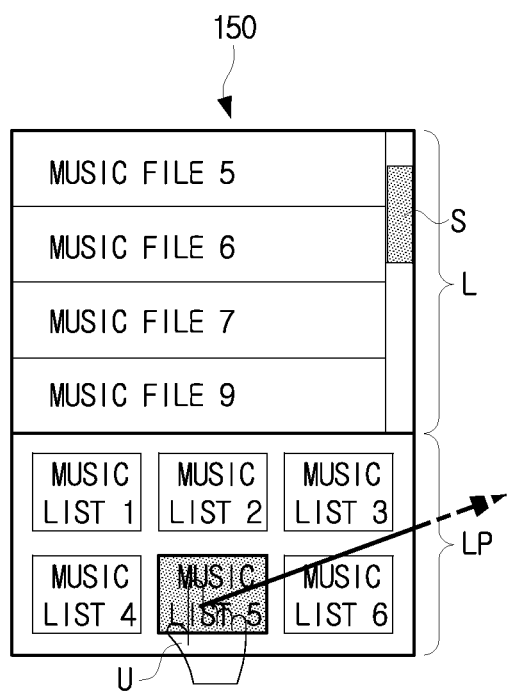
Figure 1G:
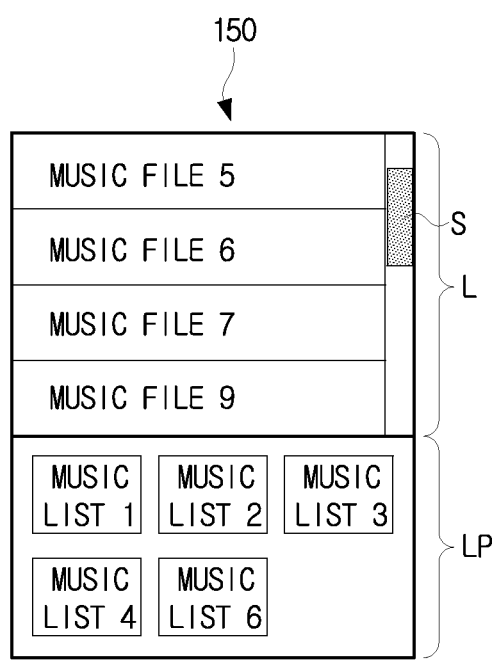
Figure 2:
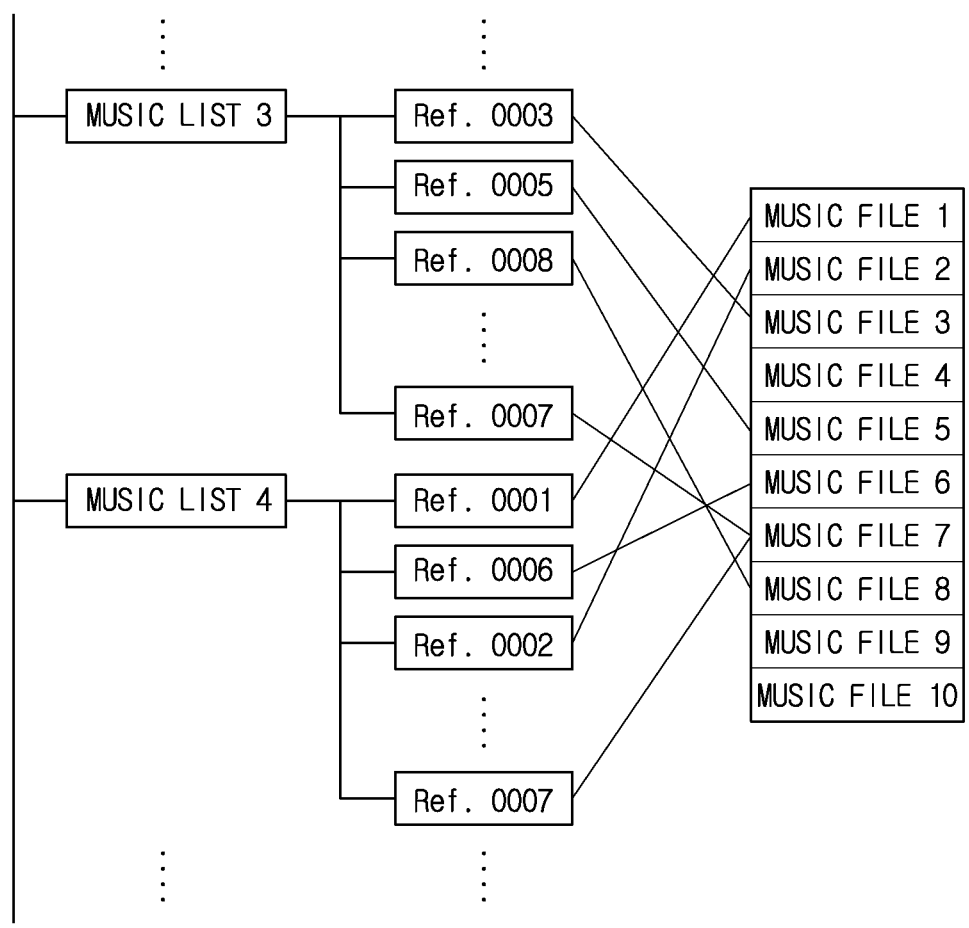
FIG. 2 is a diagram illustrating the information listed in a music list of a GUI according to an embodiment of the present invention.

FIG. 2 is a diagram illustrating the information listed in "music list 3" and "music list 4" from among the music lists illustrated in FIG. 1. Referring to FIG. 2, Ref. 0003, Ref. 0005, Ref. 0008, . . . and Ref. 0007 listed in "music list 3" indicate that the music content items belonging to "music list 3" include "music file 3," "music file 5," "music file 8," . . . and "music file 7." "Music list 3" may include reference values used to access respective music content items, instead of files of the music content items.

Furthermore, referring to Ref. 0001, Ref. 0006, Ref. 0002, . . . and Ref. 0007 listed in "music list 4," it is determined that the music content items belonging to "music list 4" include "music file 1," "music file 6," "music file 2," . . . and "music file 7." "Music list 4" may include reference values used to access respective music content items, instead of files of the music content items, in the same manner as "music list 3" described above. As can be seen in FIG. 2, the "music file 7" belongs to both "music list 3" and "music list 4," as the reference value Ref. 0007 is listed in both "music list 3" and "music list 4."

If the user U drags and drops "music file 8" to an outside of the music list screen L (as shown in FIG. 1D), "music file 8" disappears from the music list screen L (as shown in FIG. 1E)

and "music file 8" is deleted from the storage medium. Therefore, "music file 8" belonging to "music list 3" as shown in FIG. 2 is no longer in "music list 3" because "music file 8" has been deleted from the storage medium. Specifically, the reference value Ref. 0008 corresponding to "music file 8" is deleted from the reference values listed in "music list 3." Similarly, if the user U drags and drops "music file 7" to the outside the music list screen L, "music file 7" disappears from the music list screen L, is deleted from the storage medium, and is deleted from "music list 3" and "music list 4." If the user U drags and drops "music list 5" to the outside the music list pool screen LP (as shown in FIG. 1F), the "music list 5" disappears from the music list pool screen LP (as shown in FIG. 1G).

According to aspects of the present invention, the user U may delete infrequently used music lists by selecting the infrequently used music lists from the music list pool screen LP using a screen periodically providing information on the infrequently used music lists.

Figure 3A:
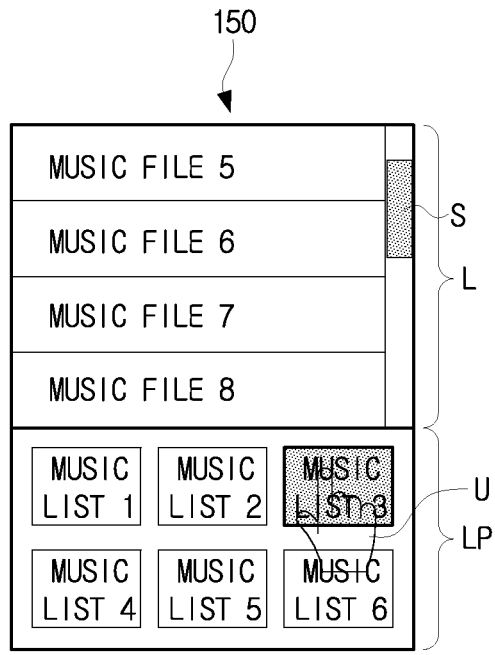
FIGS. 3A to 3F are views further explaining a GUI that enables a user to organize lists using divided screens according to an embodiment of the present invention.
Figure 3B:
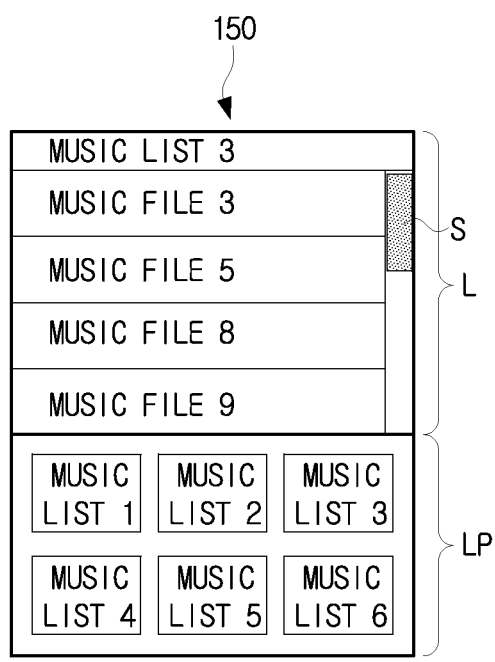

Furthermore, if the user U touches "music list 3" among music list items (as shown in FIG. 3A), music content items such as "music file 3," "music file 5," "music file 8," "music file 9," etc. are listed in the music list screen L (as shown in FIG. 3B). That is, the music list screen L may list the music content items that belong to one of the music lists displayed in the music list pool screen LP. Accordingly, the user U may touch a music content item displayed in the music list screen L to select the music content item.

Figure 3C:
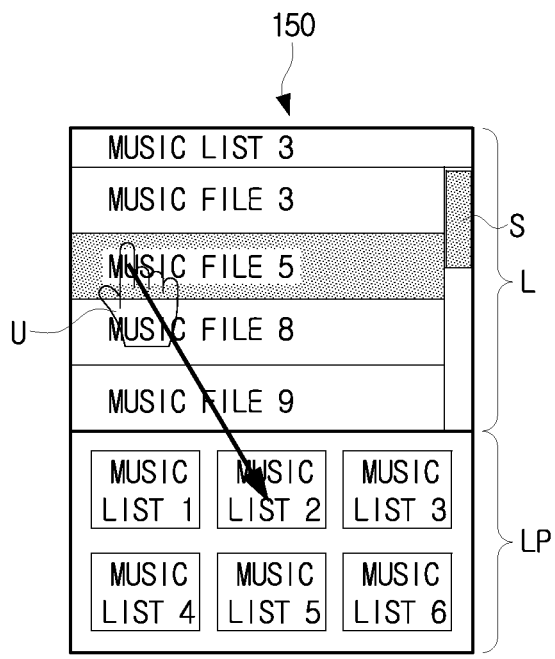
Figure 3D:
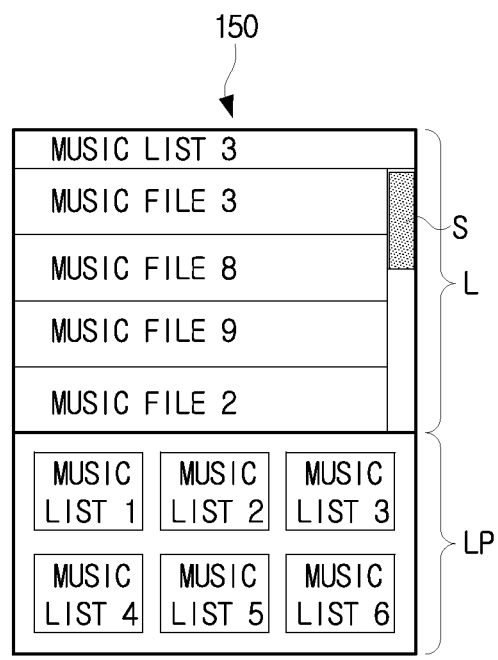

Then, if the user U drags and drops "music file 5" into "music list 2" (as shown in FIG. 3C), "music file 5" moves into "music list 2" (as shown in FIG. 3D). In other words, "music file 5" is deleted from "music list 3," and added to "music list 2." That is, the user U may move a desired music file to a desired music list by a dragging and dropping operation.

While in the above description a dragging and dropping operation by the user U moves desired music content to a desired music list, it is understood that aspects of the present invention are not limited thereto. For example, the dragging and dropping operation by the user may be implemented to add a desired music file to a desired music list without deleting the music file from the original list.

Figure 3E:
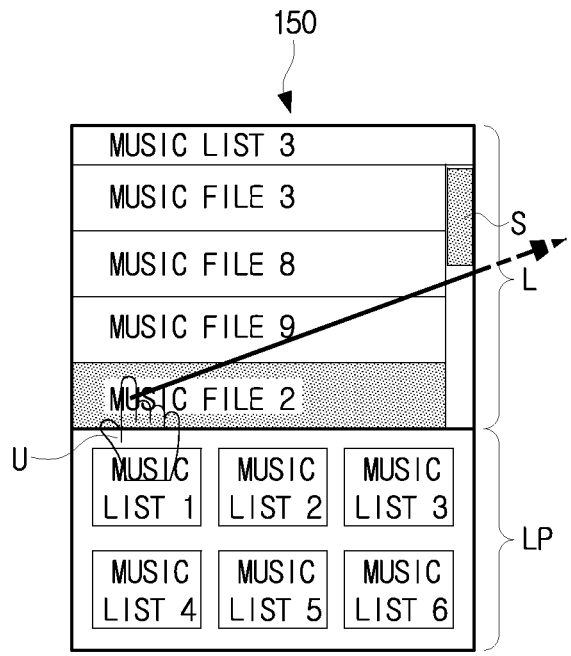
Figure 3F:
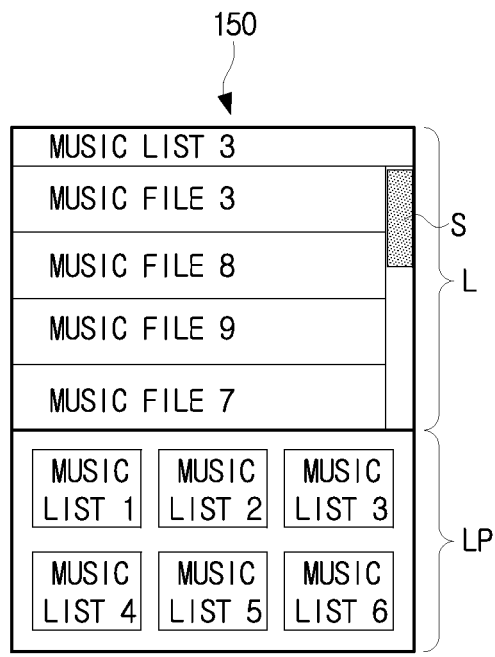

Referring to FIG. 3C, as a user U drags and drops "music file 5" into "music list 2," "music file 5" is added to "music list 2," and thus both "music list 2" and "music list 3 " include "music file 5". Referring to FIGS. 3E and 3F, if user U drags "music file 2" to an outside the music list screen L, "music file 2" disappears from the music list L and is deleted from "music list 3".

It is understood that aspects of the present invention are not limited to music files. For example, aspects of the present invention are also applicable to other types of content items (such as video files, still images, text files, menus, widgets, etc.).

Figure 4:
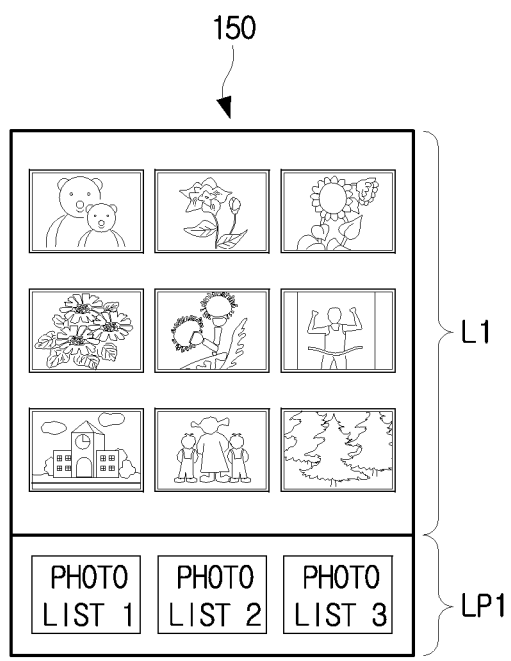
FIG. 4 is a view illustrating a list screen for photo contents and a list pool screen according to an embodiment of the present invention.

FIG. 4 illustrates a photo list screen L1 and a photo list pool screen LP1 displayed on the touch screen 150 according to an embodiment of the present invention. Referring to FIG. 4, the photo lists are edited using the photo list screen L1 and the photo list pool screen LP1, in a similar manner to that explained above with reference to editing music content. It is understood that a plurality of content items may be added to a content item list at one time, or only one content item may be added to the content item list at one time according to aspects of the present invention.

Figure 5A:
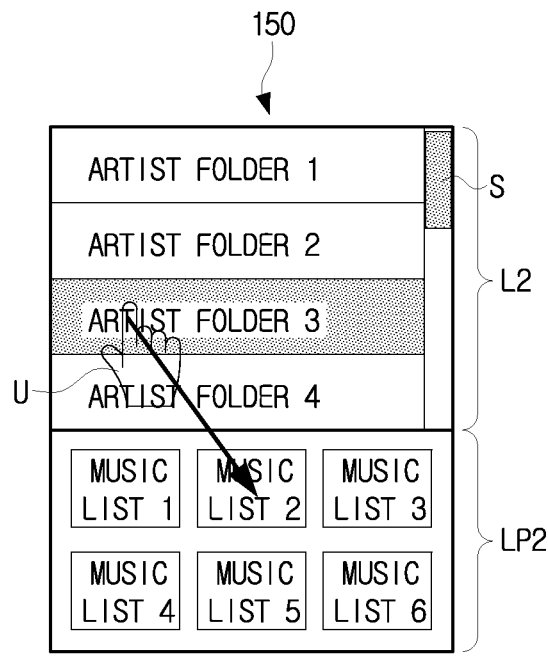
FIGS. 5A, 5B, 6A and 6B are views further explaining a GUI that enables a user to organize lists using divided screens according to an embodiment of the present invention.

FIG. 5A illustrates an artist list screen L2 implemented as an item list according to aspects of the present invention, in which "artist folder 3" includes music content items played by artist 3. If "artist folder 3" is dragged and dropped onto "music list 2" displayed in the music list pool screen LP2, all the music content items belonging to "artist folder 3" are added to "music list 2".

Figure 5B:
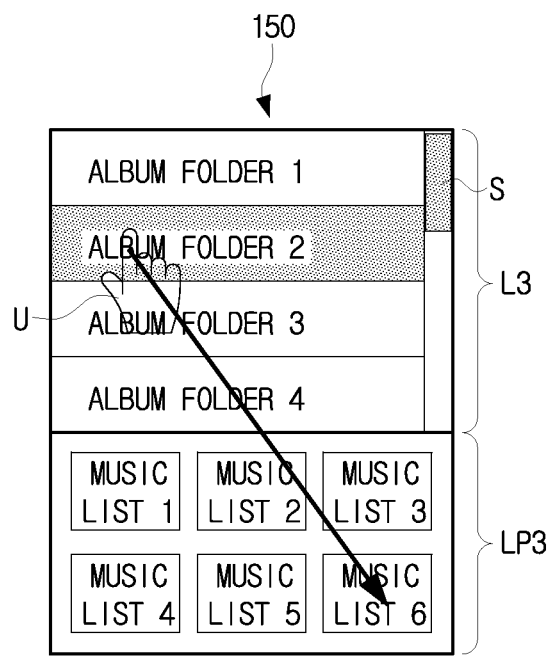

FIG. 5B illustrates an album list screen L3 implemented as an item list according to aspects of the present invention. If "album folder 2" is dragged and dropped onto "music list 6" displayed in the music list pool screen LP3, all the music content items belonging to "album folder 2" are added to "music list 6". Alternatively, a genre list (not illustrated) may be implemented as an item list. In this case, if a genre folder is dragged and dropped onto a music list, all the music content items belonging to the genre folder are added to the music list. Moreover, group folders may be formed by grouping music content items according to criteria other than artist, album or genre, as described above. For example, the music content items may be grouped according to one or more criteria (such as: shared characteristics such as "genre"; people associated with the music, such as "artist"; or specific units, such as "albums").

The user U may touch a desired music content item among the music content items listed on the music list screen L. In response, the music list screen L disappears and the music content player screen appears. In other words, the music list screen L changes to the music content player screen when a music content item is selected.

Figure 6A:
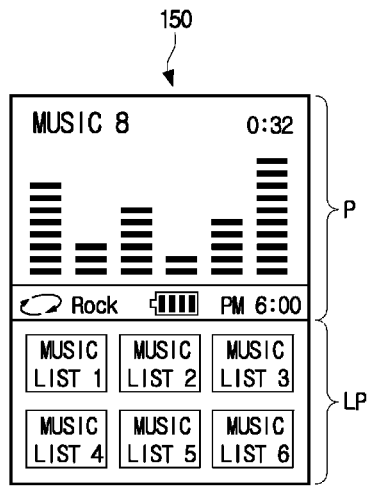
Figure 6B:
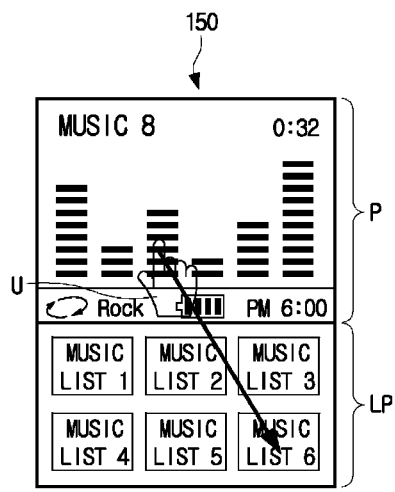

FIG. 6A illustrates a result of changing the music list screen L to the music content player screen P to play back "music file 8" when the user U touches "music file 8" from among the music content items listed on the music list screen L of FIG. 1A. Referring to FIG. 6B, if the user U drags and drops the music content player screen P onto "music list 6," "music file 8," that is currently being played back in the music content player screen P is added to "music list 6."

While in the illustrated embodiment, the touch screen 150 displays items on an upper portion thereof and displays lists on a lower portion thereof, it is understood that such an arrangement is only for the illustrative purposes, and the items and lists may be displayed in an opposite manner or in a left-to-right division of the touch screen 150. That is, the touch screen 150 may display items on a left portion thereof and display lists on a right portion thereof, or vice-versa. Furthermore, while items are moved or added by being dragged and dropped by the user U, other types of user manipulation may be applied according to other aspects of the present invention.

Figure 7A:
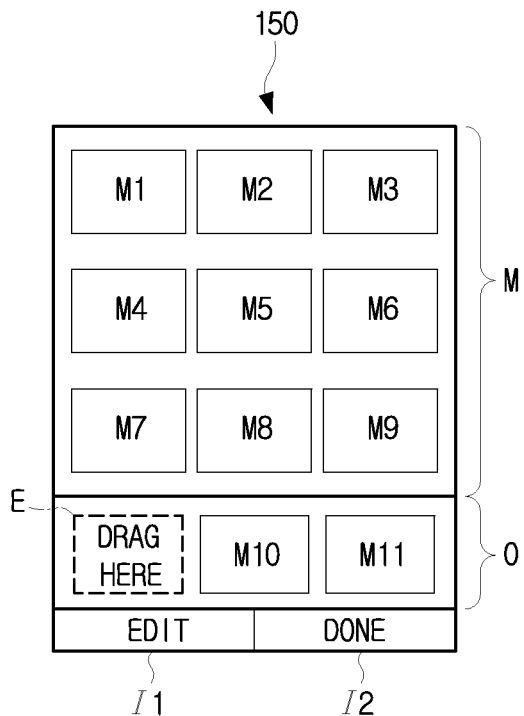
FIGS. 7A to 7N are views illustrating a GUI that enables a user to organize lists using divided screens according to another embodiment of the present invention.
Figure 7B:
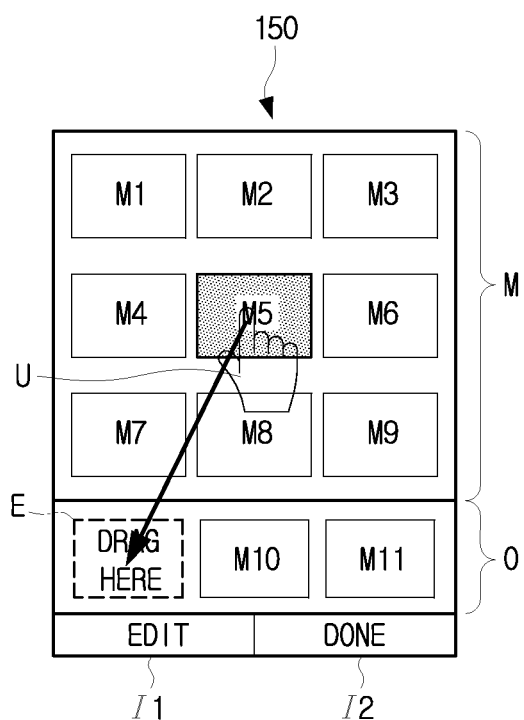
Figure 7C:
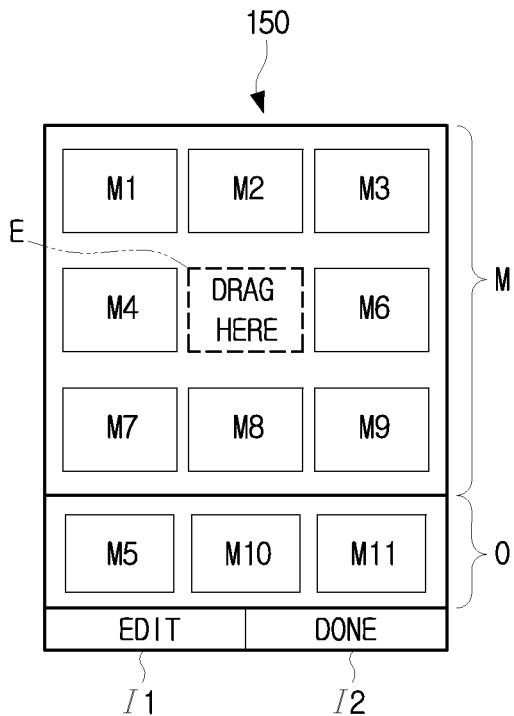
Figure 7D:
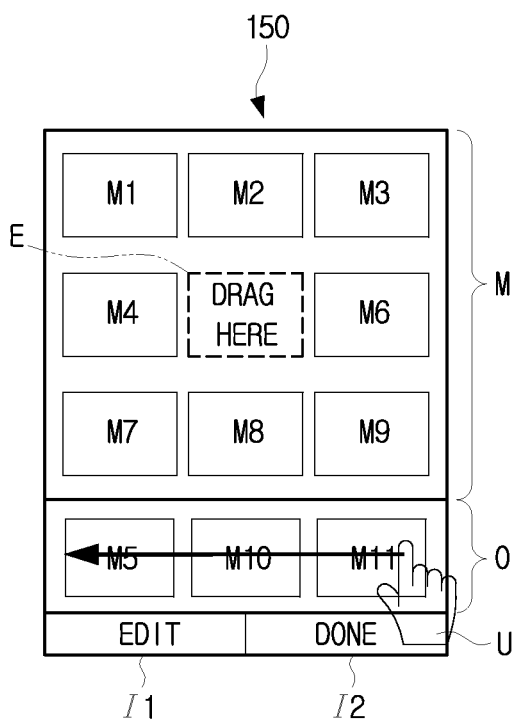
Figure 7E:
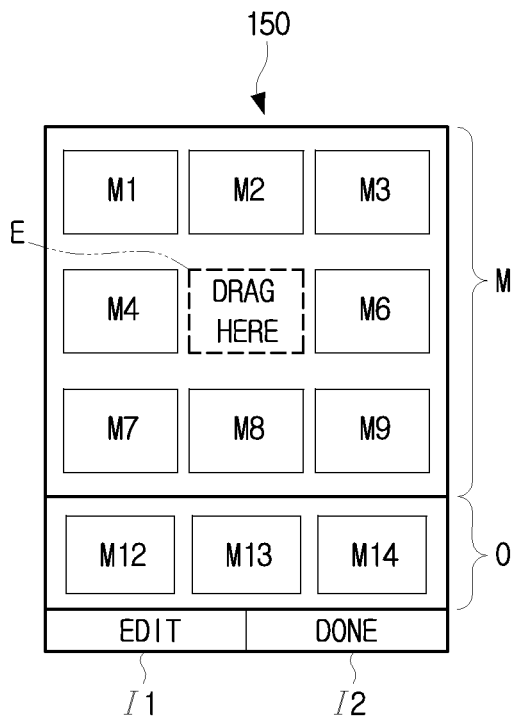
Figure 7F:
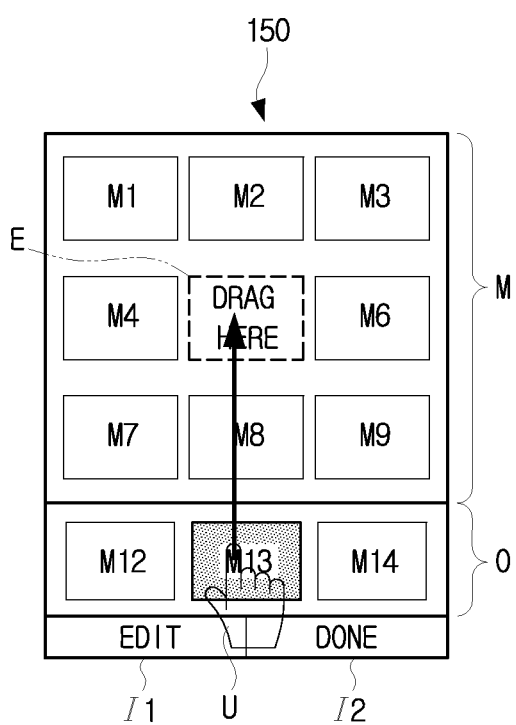
Figure 7G:
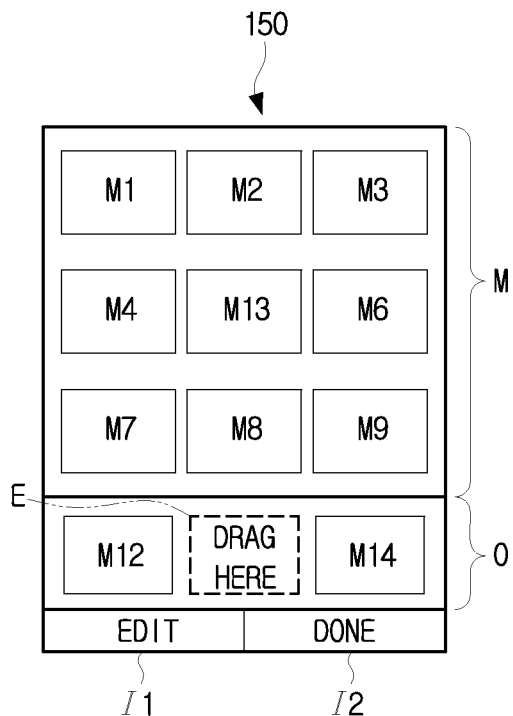
Figure 7H:
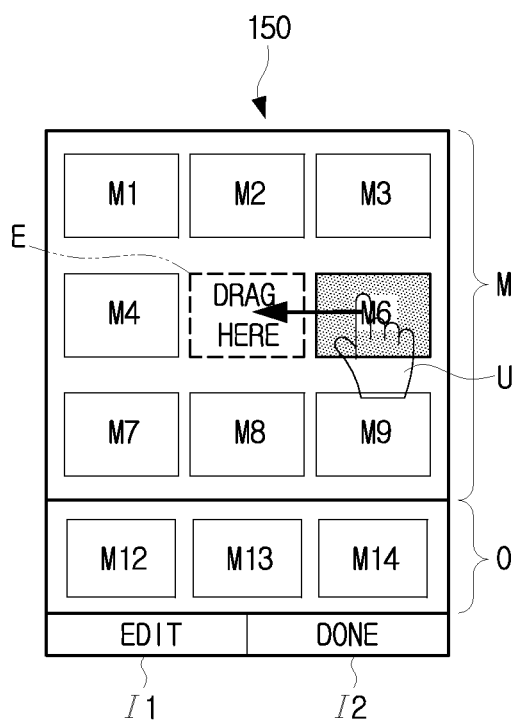
Figure 7I:
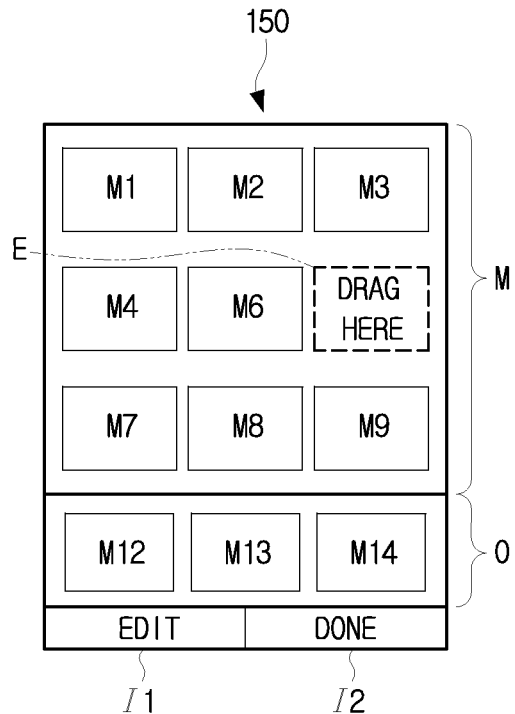
Figure 7J:
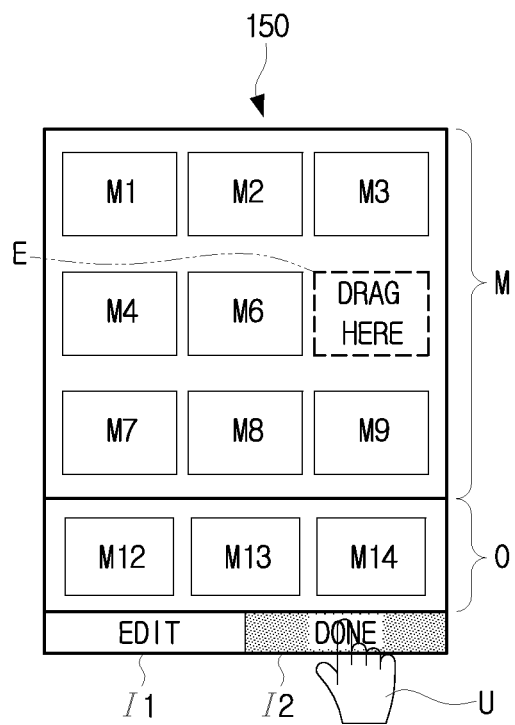
Figure 7K:
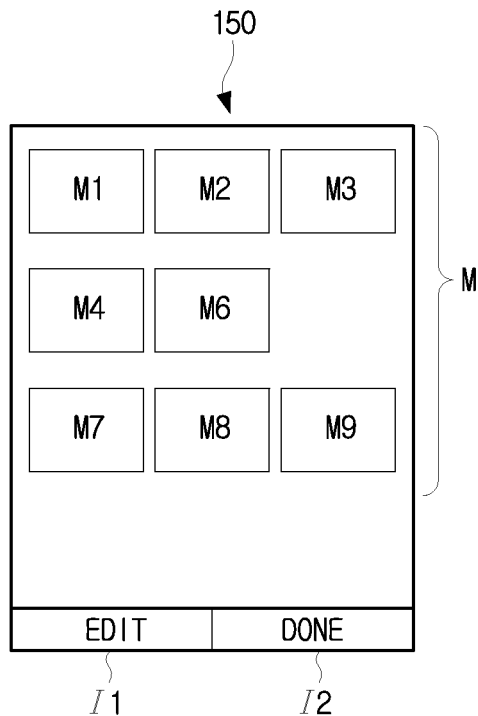
Figure 7L:
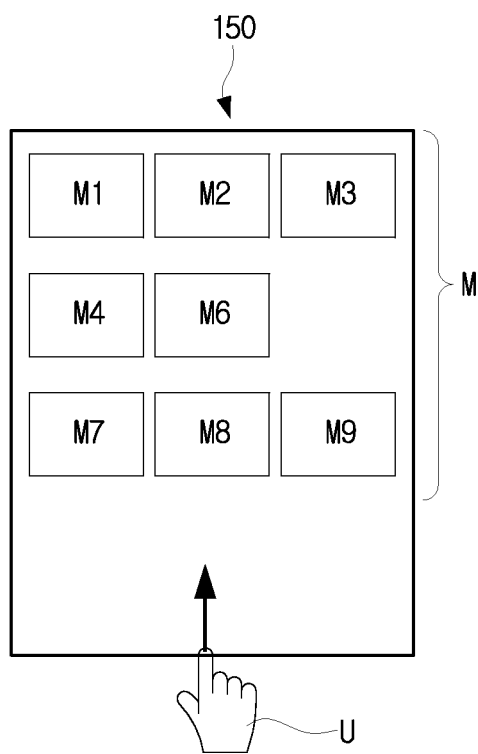
Figure 7M:
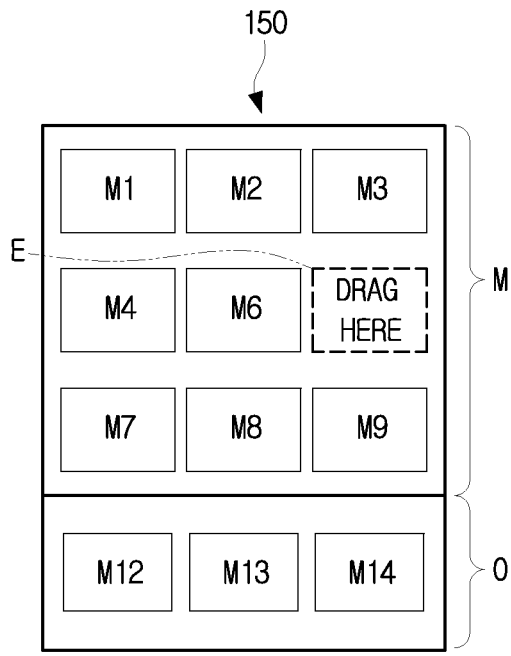
Figure 7N:
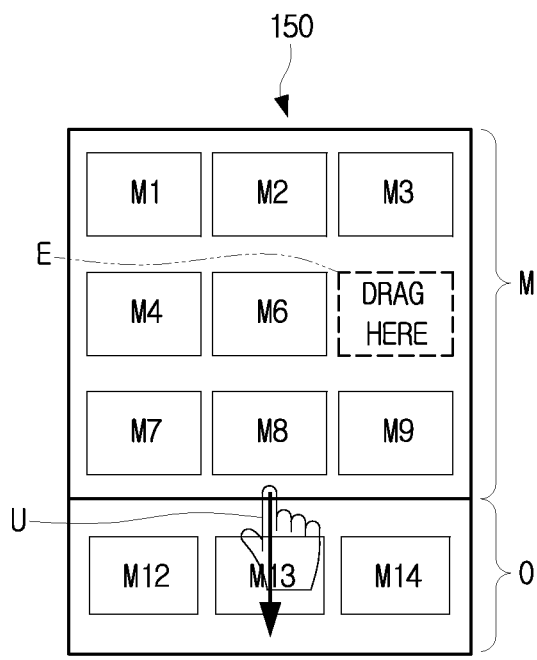

FIGS. 7A and 7N are views illustrating a GUI that enables a user to organize lists using divided screens according to another embodiment of the present invention.

Referring to FIG. 7A, a main menu item list screen M and an extra menu item list screen 0 are respectively displayed on a touch screen 150 that is divided into two sections. The lower portion of the touch screen 150 displays "edit" and "done" menu items I1 and I2.

The main menu item list screen M lists menu items belonging to a "my menu" list that includes menu items that the user frequently uses. The "my menu" list may be edited by the user and/or automatically edited according to frequencies of use. For convenience of description, the main menu item list screen M herein is referred to as the "main screen" and menu items in the main screen M are referred to as "main items." The main screen M lists 9 main items in total (M1, M2, M3, ... and M9), though it is understood that aspects of the present invention are not limited thereto. That is, the main screen M may list more or less than 9 main items in total.

The extra menu item list screen 0 lists menu items other than the main items. For convenience of description, "extra menu item list screen 0" is referred to as the "extra list screen," and the menu items listed on the extra screen are referred to as "extra menu items." In FIG. 7A, "M10" and "M11," are extra items listed on the extra screen 0. On the extra list screen 0, there is a blank region E indicated with a dotted region. In the blank region E, "Drag Here" is displayed to assist a user to drag and drop menu items onto the blank region E. Accordingly, the user is able to drag and drop one of the menu items onto the blank region E, from among the main items or other items.

Referring to FIG. 7B, as the user drags and drops the main item "M5" onto the blank region E, the main item "M5" moves to the extra screen 0 as shown in FIG. 7C. The main item M5 disappears from the main screen M and is deleted from "my menu list." The blank region E moves to the main screen M. However, it is understood that according to other aspects, when the user drags and drops the main item onto the blank region E, the main item moves to the extra screen 0 and remains on the main screen M. Furthermore, according to other aspects, the main item may be removed from the main screen M and/or an extra menu item may be removed from the extra list screen 0 by dragging and dropping the item to a border area of either screen M or 0.

Furthermore, if the user drags the extra screen 0, other extra items may be displayed. For example, referring to FIG. 7D, as the user drags the extra screen 0 to the left, extra items M5, M10 and M11 disappear from the extra item screen as shown in FIG. 7E, and new items M12, M13 and M14 appear. Conversely, as the user drags the extra screen 0 to the right, the extra screen returns to the display pattern illustrated in FIG. 7C.

Also, according to aspects of the present invention, the user can drag and drop extra items of the extra screen onto the blank region E of the main screen. For example, if the user drags and drops extra item M13 into the blank region E as shown in FIG. 7F, extra item M13 is moved to the main screen as shown in FIG. 7G, and the blank region E moves to the extra screen. The item M13, newly appearing in the main screen M, is added to "my menu list." However, it is understood that according to other aspects, when the user drags and drops the extra item onto the blank region E, the extra item moves to the main screen M and remains on the extra screen 0.

As shown in FIG. 7F, if the blank region E is displayed in the main screen M, the user is able to drag and drop a main item onto the blank region E. That is, if the user drags and drops the main item M6 into the blank region E, the main item M6 moves to an area where the blank region was previously located (as shown in FIG. 7I), and the blank region E moves to the location where the main item M6 was previously located. That is, the main item M6 moves to the left of the main screen M, and the blank region E moves to the right of the main screen M. In other words, the main item M6 and the blank region E exchange positions. Since the main item M6 moves within the main screen M, the item M6 is not deleted from "my menu list."

When the user U touches the "done" menu item I2 in the lower portion of the touch screen 150 (as shown in FIG. 7J), the extra screen 0 disappears (as shown in FIG. 7K) and the previous blank region E in the main screen M also disappears. The user U may select a desired main item from among the main items on the touch screen 150 shown in FIG. 7K in order to execute the selected main item. For example, if the user U touches "M7" representing a music player, a music player screen appears on the touch screen 150.

The user U cannot edit the "my menu" list directly through the touch screen 150 shown in FIG. 7K. Rather, in order to edit the "my menu" list, the user U touches the "edit" menu item I1 appearing on the lower portion of the touch screen 150 so that the extra screen 0 and blank region E that have disappeared as shown in FIG. 7I may appear again.

As described above, if the user U touches the "edit" menu item I1, the extra screen 0 and blank region E appear so that the user U is able to edit the "my menu" list. Furthermore, if the user U touches the "done" menu item I2, the extra screen 0 and blank region E disappear, so that the user cannot edit the "my menu" list. However, aspects of the present invention are not limited thereto. According to other aspects, the user U may edit the "my menu" list using other methods instead of touching items on the touch screen 150. For example, if the user U touches remaining regions in which no main items appear on the touch screen 150 of FIG. 7K, the extra screen 0 and blank region E may appear as shown in FIG. 7M, so that the user U may edit the "my menu" list. Alternatively, if the user U drags up the bottom of the touch screen 150 (as shown in FIG. 7L), the extra screen 0 and the blank region E may appear on the touch screen 150 (as shown in FIG. 7M) so that the user U may edit the "my menu" list. In this situation, if the user U drags down the top of the extra screen 0 (as shown in FIG. 7N), the extra screen 0 and the blank region E may disappear (as shown in FIG. 7L).

The extra screen 0 may be made to appear or disappear in a similar manner to that described above with reference to the music list pool screen LP shown in FIG. 1A. The menu items have been described in the above embodiments to explain a GUI to enable the user to manage lists using divided screens according to aspects of the present invention. However, the menu items described above are merely examples for convenience of description. Aspects of the present invention are also applicable to other items (such as moving image content, still image content, music content, text content, and/or widget items).

Figure 8:
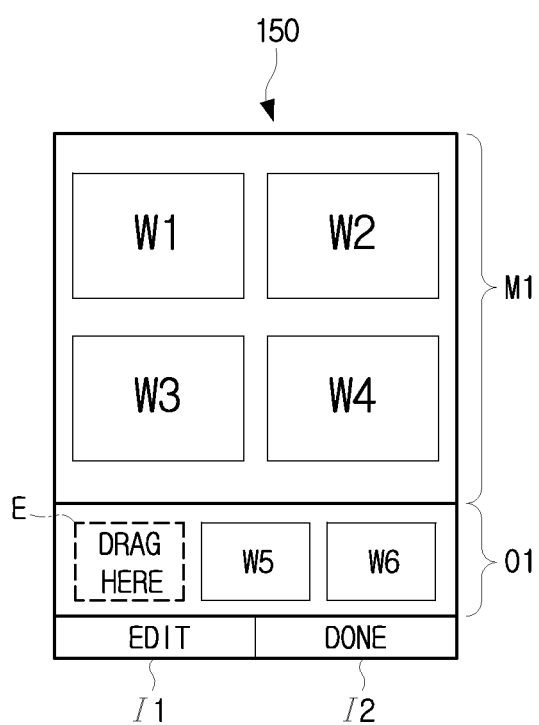
FIG. 8 is a view illustrating a main screen and other screens having widget items.

FIG. 8 illustrates a touch screen 150 to display a main screen M1 and an extra screen O1 when widget items are employed according to yet another embodiment of the present invention. A "my widget" list is edited using the main screen M1 and the extra screen O1 displaying the widget items shown in FIG. 8 in a similar manner to that described above with reference to FIGS. 7A to 7N, so a detailed description thereof is omitted.

Figure 9A:
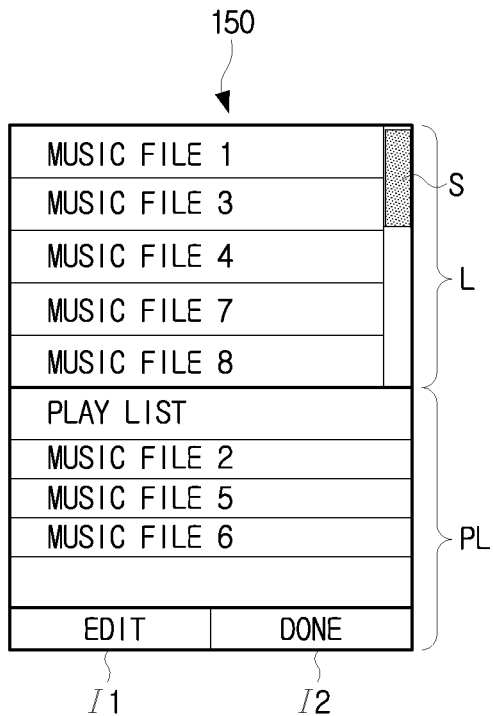
FIGS. 9A to 9E are views illustrating a GUI that enables a user to organize lists using divided screens according to yet another embodiment of the present invention.

Hereinafter, a GUI to enable a user to manage lists using divided screens according to an embodiment of the present invention will be described with reference to FIGS. 9A to 9E. Referring to FIG. 9A, a touch screen 150 divided into two screens displays a music list screen L and a playlist screen PL, respectively. Additionally, a scroll bar S is displayed to the right of the music list screen L, and "edit" and "done" menu items I1 and I2 are displayed on a lower portion of the touch screen 150.

Figure 9B:
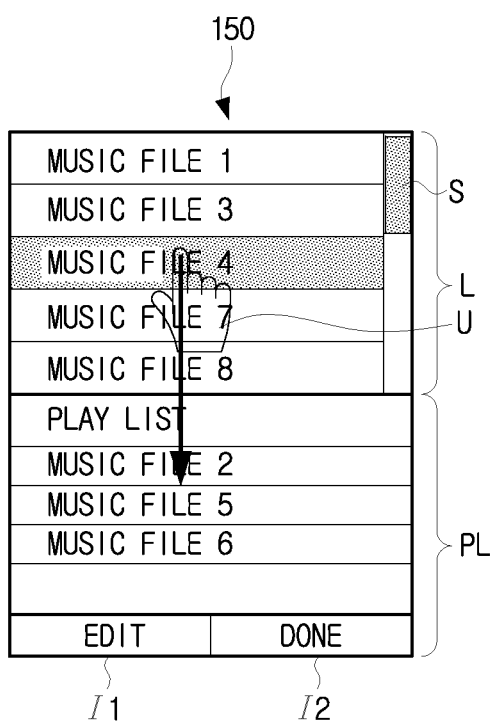
Figure 9C:
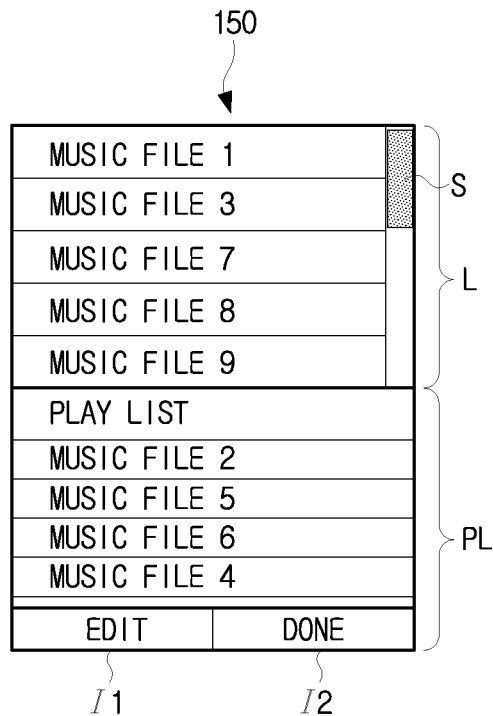

The playlist screen PL displays music content items selected by the user, and the music list screen L displays non-selected music content items that are not displayed on the playlist screen PL from among music content items stored in a storage medium. The user may add a desired music content item from among the music content items of the music list screen L to the playlist screen PL by a dragging and dropping operation. For example, if the user U drags and drops "music file 4" onto the playlist screen PL (as shown in FIG. 9B), "music file 4" moves to the playlist screen PL (as shown in FIG. 9C). As a result, "music file 4" may disappear from the music list screen L while appearing on the playlist screen PL, so that "music file 4" is added to the playlist.

Figure 9D:
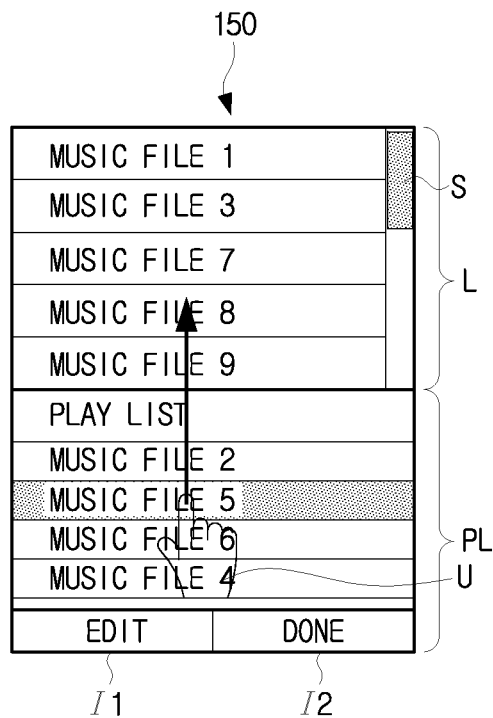
Figure 9E:
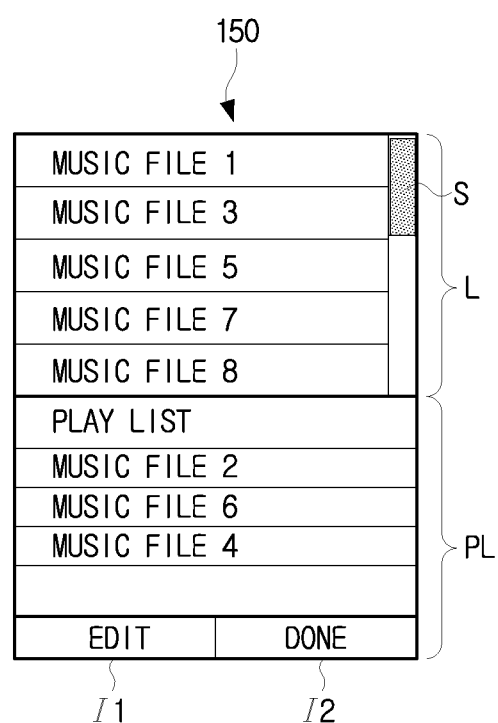

Conversely, the user U may delete a music content item from the playlist screen PL by dragging and dropping the music content item from the playlist screen PL onto the music list screen L. For example, if the user U drags and drops "music file 5" onto the music list screen L (as shown in FIG. 9D), "music file 5" moves onto the music list screen L (as shown in FIG. 9E). Accordingly, "music file 5" disappears from the playlist screen PL and appears on the music list screen L, and is thus deleted from the playlist.

While in the present description music content items are provided to describe a GUI whereby the list may be managed using divided screens according to aspects of the present invention, the music content item are provided merely as an example for convenience of description. That is, aspects of the present invention may be applied to other forms of content (such as moving image content, still image content, text content, menu item, and/or widget items).

Figure 10:
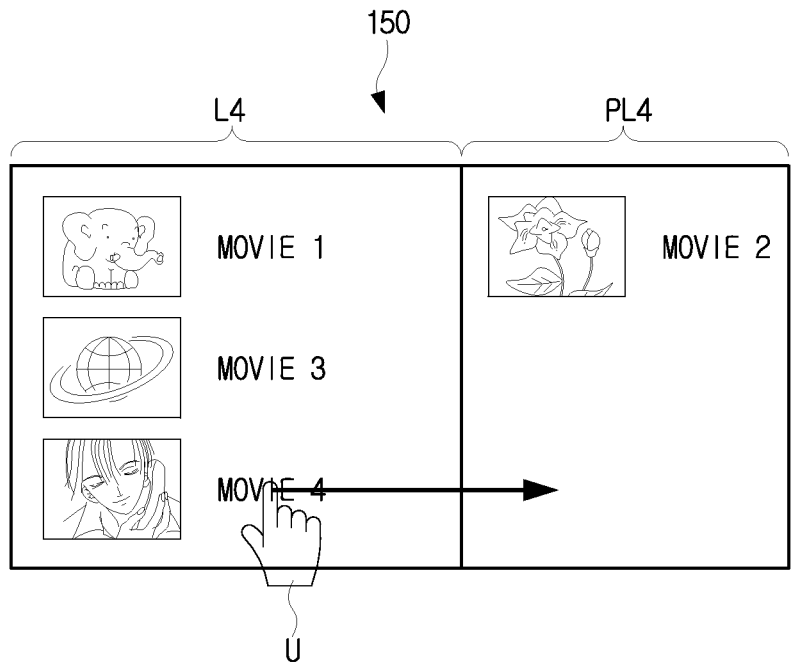
FIG. 10 is a view illustrating a list screen and a play list for movie contents.

FIG. 10 illustrates a touch screen 150 divided into a movie list screen L4 and a playlist screen PL4, in which a moving image content item is displayed instead of the music content item, according to an embodiment of the present invention. Specifically, FIG. 10 illustrates a method for adding "movie 4" to the playlist screen LP4. While the screens L4 and PL4 are vertically arranged in FIG. 10, it is understood that the screens L4 and PL4 may also be arranged horizontally. The touch screen 150 of FIG. 10 is distinct from those of the foregoing embodiments of the present invention in that the movie list screen L4 and the playlist screen PL4 are arranged horizontally instead of being arranged vertically. However, as this is merely an example embodiment of the present invention, it is understood that aspects of the present invention may also be applied to a touch screen 150 on which the movie list screen L4 and the playlist screen PL4 are arranged vertically.

The method for adding the movie content item to and deleting the movie content item from the playlist using the movie list screen L4 and the playlist screen PL4 as shown in FIG. 10 is similar to the method of adding and deleting the music content item of the above embodiments of the present invention, so a detailed description is omitted herein.

Figure 11:
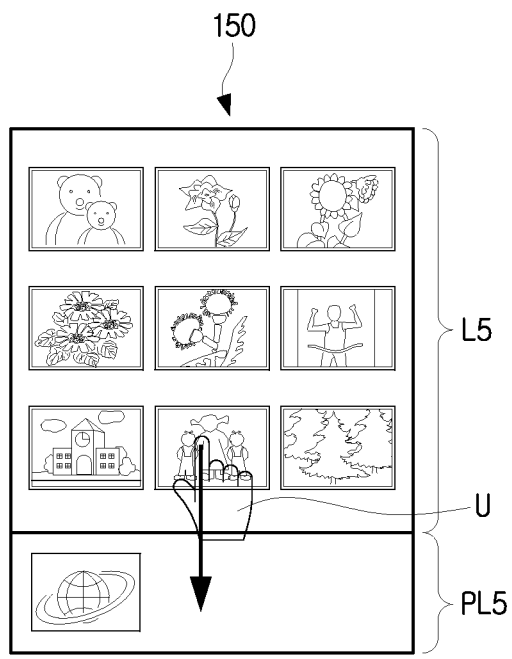
FIG. 11 is a view illustrating a content list and a play list for image files.

FIG. 11 illustrates a touch screen 150 on which a photographic list screen L5 and a playlist screen PL5 are displayed containing photographic content item applied according to an embodiment of the present invention. Specifically, FIG. 11 illustrates a method whereby the user U may add a photographic content item from a bottom of the photographic list screen L5 to the playlist screen LP5. The method of adding the photographic content item to and deleting the photographic content item from the playlist using the photographic list screen L5 and the playlist screen PL5 as shown in FIG. 11 is similar to the method for adding and deleting the music content item of the above embodiments of the present invention, so a detailed description is omitted herein.

Figure 12A:
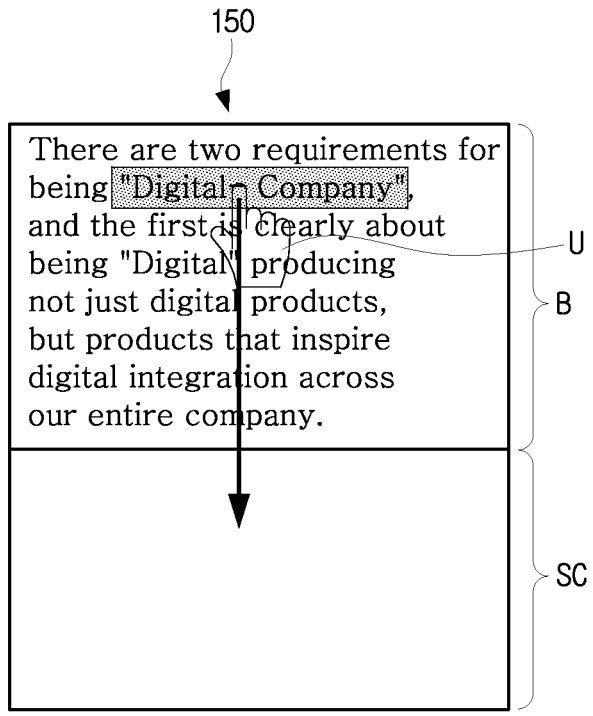
FIGS. 12A to 12C are views illustrating a method by which parts of e-book are added to or removed from a scrap list.
Figure 12B:
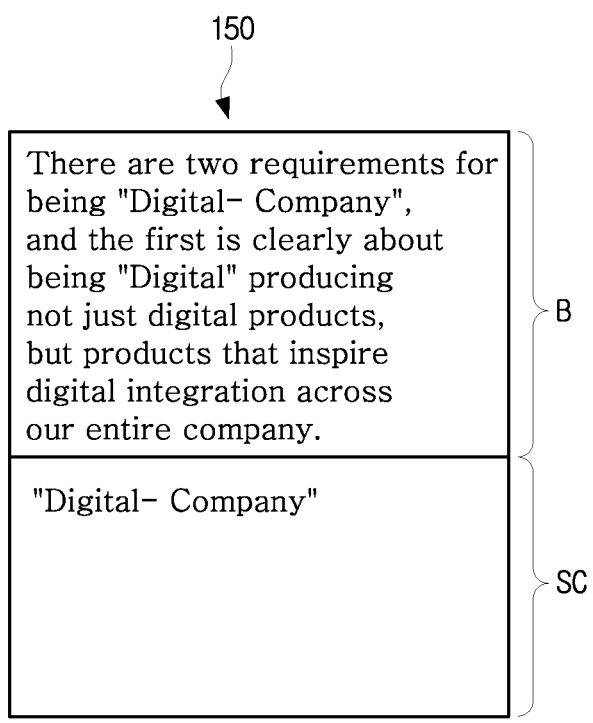
Figure 12C:
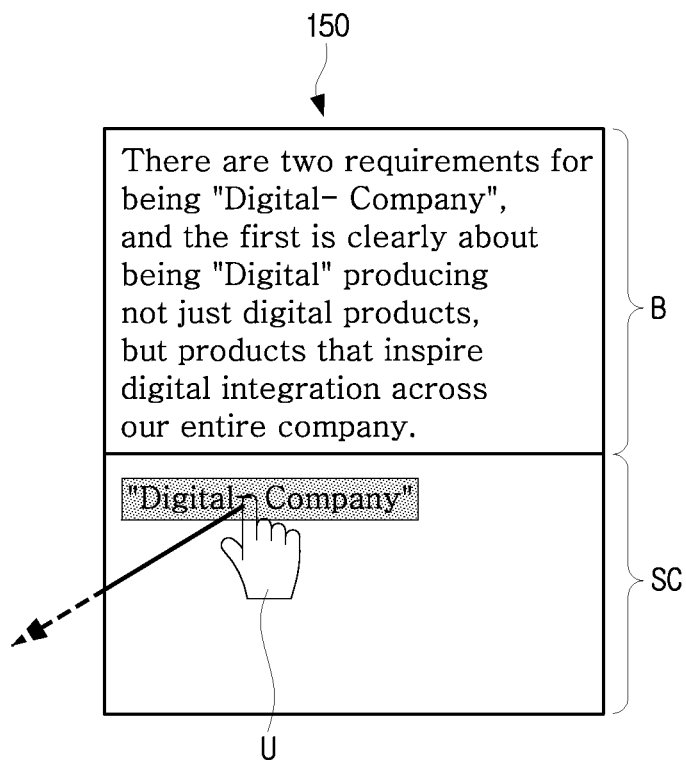

FIGS. 12A to 12C illustrate a touch screen 150 having an e-book content screen B and a scrap list screen SC, in which e-book content is applied as a type of text content item, according to an embodiment of the present invention. When the user U selects a portion of the e-book content and drags and drops the selected portion onto the scrap list screen SC, the selected portion is copied into the scrap list screen SC (as shown in FIG. 12B), and is added to a scrap list. Alternatively, if the user U drags and drops a portion of the e-book content to an outside of the scrap list screen SC (as shown in FIG. 12C), the portion of the e-book content disappears from the scrap list screen SC. Accordingly, the portion of the e-book content is deleted from the scrap list.

Figure 13:
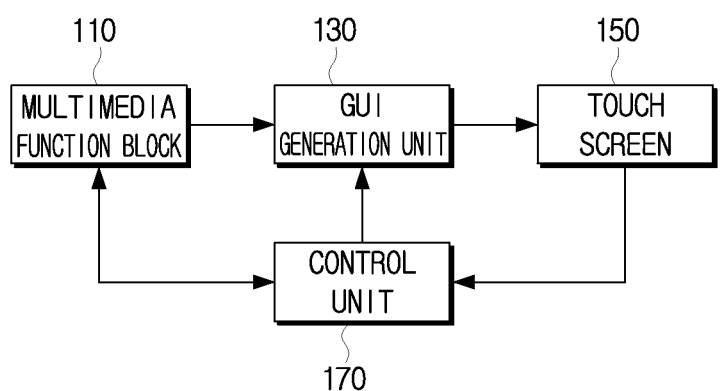
FIG. 13 is a block diagram describing a GUI according to an embodiment of the present invention.

FIG. 13 is a block diagram of a multimedia apparatus capable of providing a GUI according to an embodiment of the present invention. Referring to FIG. 13, a multimedia apparatus includes a multimedia function block 110, a GUI generation unit 130, a touch screen 150, and a control unit 170.

The multimedia function block 110 performs basic functions such as playing back moving image content, still image content, music content, and/or text content. The basic functions of the multimedia function block 110 may vary according to the type of multimedia apparatus employed.

The GUI generation unit 130 generates a GUI according to aspects of the present invention, as described above. The GUI generation unit 130 then adds the generated GUI to an image output from the multimedia function block 110.

The touch screen 150 displays the image to which the GUI received from the GUI generation unit 130 has been added. The touch screen 150 may display only the GUI if the multimedia function block 110 does not output an image, or if the multimedia function block 110 does output an image but the generated GUI is larger or equal in size to the image. Also, the touch screen 150 receives user commands input by a user U (for example, by a touch, a drag, and/or a drag-and-drop).

The control unit 170 controls the operation of the multimedia function block 110 according to a manipulation by a user U using the touch screen 150 or a separate manipulating unit (not illustrated). The control unit 170 also controls the GUI generation unit 130 to display a GUI according to the manipulation by the user U. Such a GUI may be any of the GUIs that are generated according to the abovementioned embodiments of the present invention.

Figure 14:
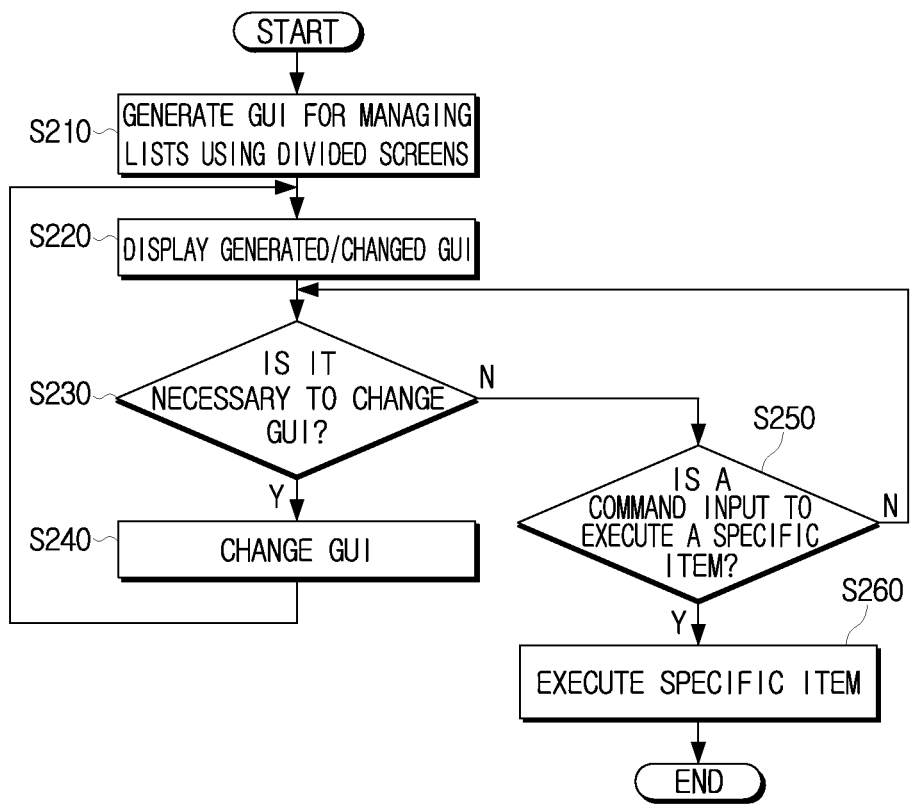
FIG. 14 is a flow chart illustrating a GUI-providing method of the multimedia device shown in FIG. 13.

The operation of the multimedia apparatus illustrated in FIG. 13 to provide a GUI will now be explained with reference to FIG. 14. FIG. 14 is a flow chart illustrating a GUI-providing method of the multimedia device shown in FIG. 13. Referring to FIG. 14, the control unit 170 controls the GUI generation unit 130 to generate a GUI for list management using divided screens in operation S210. The touch screen 150 displays the generated GUI in operation S220. Any of the GUI described above according to the embodiments of the present invention may be generated (operation S210) and displayed (operation S220).

If it is necessary to change the displayed GUI (operation S230-Y), the control unit 170 controls the GUI generation unit 130 to generate a changed GUI in operation S240. As a result, the touch screen 150 displays the changed GUI of S240 in operation S220. It may be determined that the GUI is to be changed in operation S230 according to a manipulation by the user U using the touch screen 150 (for example, by a touch, a drag, and/or a drag-and-drop).

If the user U inputs a command to execute a specific item included in the generated or changed GUI of S220 (operation S250-Y), the control unit 170 executes the corresponding item in operation S260. The control unit 170 may operate the multimedia function block 110 in operation S260. For example, music content may be played back if the music content is commanded to be executed in operation S260.

Figure 15:
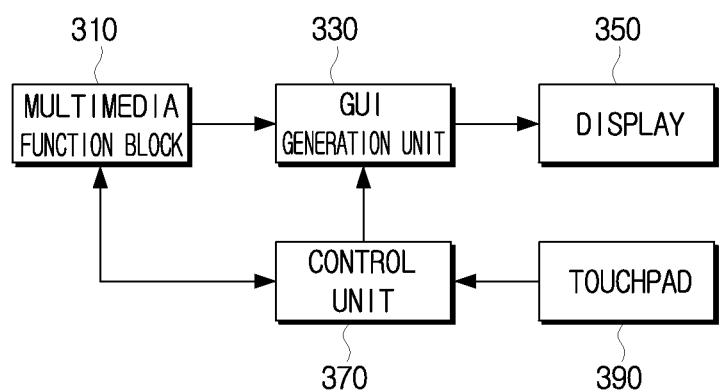
FIG. 15 is a block diagram of multimedia device providing a GUI according to another embodiment of the present invention.

FIG. 15 illustrates a multimedia apparatus according to another embodiment of the present invention. The multimedia apparatus of FIG. 15 includes a multimedia function block 310 and a GUI generation unit 330, to operate in a similar manner to the multimedia function block 110 and the GUI generation unit 130 of FIG. 13. Accordingly, the operations of the multimedia function block 310 and the GUI generation unit 330 will not be explained in detail for the sake of brevity.

The display 350 displays an image to which a GUI received from the GUI generation unit 330 has been added. A touchpad 390 is additionally provided to receive user commands input, for example, by a touch, a drag, and/or a drag-and-drop. A control unit 370 is also provided to control the operations of the multimedia function block 110 according to the manipulation by the user U received through the touchpad 390 or a separate manipulating means (not illustrated). Accordingly, the control unit 370 controls the GUI generation unit 330 to display a GUI according to the manipulation by the user U on a display 350.

Figure 16:
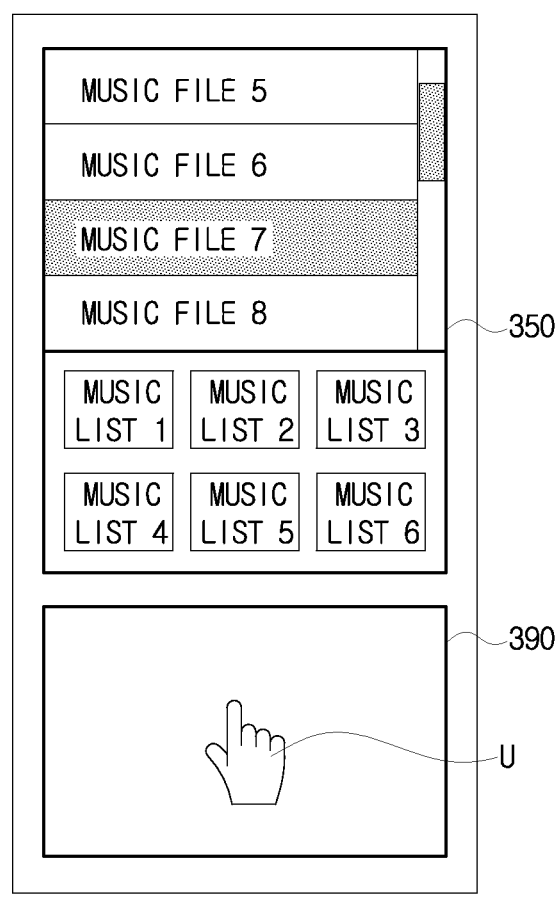
FIG. 16 is a view illustrating the exterior of the multimedia device shown in FIG. 15.

FIG. 16 illustrates an outer configuration of the multimedia apparatus of FIG. 15. Referring to FIG. 16, the display 350 is provided on an outer portion (such as a surface) of the multimedia apparatus to display a GUI according to aspects of the present invention. The user U may manipulate the GUI through the use of the touchpad 390. For example, the user U may edit items and lists using a highlighting or a pointer (not illustrated) provided by the display 350, by manipulating the touchpad 390 using a touch, a drag, and/or a drag-and-drop. While FIG. 16 illustrates the GUI of FIG. 1A according to an embodiment of the present invention, it is understood that other GUIs may also be displayed.

As explained above, according to aspects of the present invention, a user U is provided with a GUI and is enabled to manage lists using divided screens. As a result, the user U is able to manage or edit the lists of the items with increased intuition and convenience, while experiencing a superior visual effect.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of providing a graphical user interface (GUI) on a display of a portable multimedia apparatus, the method comprising:

displaying a plurality of items on a first screen of the display;

displaying a plurality of lists on a second screen of the display;

adding an item selected by a user from among the plurality of items displayed on the first screen, to a list selected by the user from among the plurality of lists displayed on the second screen; and deleting the item selected by the user from among the plurality of items from the first screen if the user drags the item to an outside of the display of the portable multimedia apparatus, wherein the deleting of the item selected by the user from among the plurality of items from the first screen also comprises deleting the item added to the list selected by the user from among the plurality of the lists displayed on the second screen.

2. The method as claimed in claim 1, wherein the first screen and the second screen are simultaneously displayed on a first part and a second part, respectively, of the display.

3. The method as claimed in claim 1, wherein the adding of the selected item comprises dragging and dropping the selected item from the first screen onto the selected list of the second screen by the user.

4. The method as claimed in claim 3, wherein:

the display is a touch screen; and the dragging and dropping of the selected item comprises dragging and dropping the selected item by the user touching the touch screen.

5. The method as claimed in claim 3, wherein the dragging and dropping of the selected item comprises dragging and dropping the selected item using an input unit that is provided separately from the display showing the first screen and the second screen.

6. The method as claimed in claim 1, further comprising:

deleting the dragged item from any of the plurality of lists including the dragged item.

7. The method as claimed in claim 1, wherein the plurality of items are arranged on the first screen in a first arrangement format and the plurality of lists are arranged on the second screen in a second arrangement form different from the first arrangement format.

8. A computer readable recording medium encoded with the method of claim 1 and implemented by a computer.

9. The method as claimed in claim 1, wherein the plurality of items include image content, still image content, music content, text content, one or more menu items, and/or one or more widget items.

10. The method as claimed in claim 1, wherein:

the displaying of the plurality of items comprises displaying groups of the items on the first screen; and the adding of the item selected by the user comprises adding a group selected by the user from among the groups on the first screen, to the list selected by the user from among the plurality of lists on the second screen.

11. The method as claimed in claim 10, wherein the groups of the items comprise groups classified according to shared characteristics of the items therein, groups classified according to persons associated with the items therein, and/or groups classified according to objects associated with the items therein.

12. The method as claimed in claim 10, wherein the items are music files, and the groups of the music files comprise groups classified according to genre, groups classified according to artist, and/or groups classified according to album.

13. The method as claimed in claim 1, further comprising:

removing the plurality of items from the first screen if a command to execute an item from among the plurality of items is input; and displaying an executing screen to execute the item on the first screen if the command to execute the item from among the plurality of items is input.

14. The method as claimed in claim 13, wherein the adding of the selected item comprises adding the item executing on the executing screen to the list selected by the user from among the plurality of lists on the second screen.

15. The method as claimed in claim 14, wherein the adding of the item executing on the executing screen comprises adding the item of the executing screen on the first screen to the selected list if an area of the executing screen is dragged and dropped to the selected list on the second screen.

16. The method as claimed in claim 14, wherein the plurality of items include multimedia content, and the executing screen on the first screen is a multimedia content player.

17. The method as claimed in claim 14, wherein the plurality of items include multimedia content, and the selected list comprises reference values to be used to access the multimedia content displayed on the first screen.

18. The method as claimed in claim 17, wherein each reference value comprises addresses of locations at which the multimedia content is stored, and/or an address of a location to be read first when the multimedia content is accessed.

19. The method as claimed in claim 1, wherein an item on the first screen belongs to both a first list and a second list on the second screen.

20. The method as claimed in claim 19, wherein the plurality of items include multimedia content, and the first list and the second list each comprise a reference value to be used to access a specific multimedia content.

21. The method as claimed in claim 1, wherein the plurality of items on the first screen belongs to a first list of the plurality of lists on the second screen.

22. The method as claimed in claim 21, further comprising: deleting the dragged item from the first list.

23. The method as claimed in claim 1, further comprising deleting an item from a storage medium if the user drags the item to an outside of the first screen,
wherein the plurality of items on the first screen are stored in the storage medium.

24. The method as claimed in claim 23, further comprising deleting the dragged item from one or more list of the plurality of lists to which the dragged item belongs.

25. The method as claimed in claim 24, wherein the deleting of the dragged item from the one or more lists comprises deleting a reference value that is used to access the dragged item from the one or more lists to which the dragged item belongs.

26. The method as claimed in claim 23, further comprising deleting a reference value that is used to access the dragged item from one or more lists to which the dragged item belongs.

27. The method as claimed in claim 1, further comprising deleting a list of the plurality of lists selected by the user from the second screen.

28. The method as claimed in claim 27, wherein the list selected by the user is a list dragged to an outside of the second screen by the user, or a list selected by the user with reference to a screen that is provided to the user in order to inform the user of lists that are used less frequently from among the plurality of lists.

29. A portable multimedia apparatus including a display to provide a graphical user interface (GUI), the multimedia apparatus comprising:
a generation unit to generate the GUI on the display of the portable multimedia apparatus; and
a control unit to control the generation unit to generate the GUI such that a plurality of items are displayed on a first screen of the display of the portable multimedia apparatus and a plurality of lists are displayed on a second screen of the display of the portable multimedia apparatus, and an item selected by a user from among the plurality of items displayed on the first screen is added to a list selected by the user from among the plurality of lists displayed on the second screen, and to delete an item from the first screen if the user drags the item to an outside of the display of the portable multimedia apparatus,
wherein the deleting of the item from the first screen of the display of the portable multimedia apparatus also comprises deleting the item added to the list selected by the user from among the plurality of lists displayed on the second screen.

30. The apparatus as claimed in claim 29, wherein the first screen and the second screen are simultaneously displayed on a first part and a second part, respectively, of the display.

31. The apparatus as claimed in claim 29, wherein the control unit controls the selected item to be added to the selected list when the user drags and drops the selected item of the first screen onto the selected list of the second screen.

32. The apparatus as claimed in claim 29, wherein the display is a touch screen.

33. The apparatus as claimed in claim 29, wherein the plurality of items include moving image content, still image content, music content, text content, one or more menu items, and/or one or more widget items.

34. The apparatus as claimed in claim 29, wherein the control unit controls the generation unit to generate the GUI such that groups of the items are displayed on the first screen, and items from a group selected by the user from among the groups on the first screen are added to the list selected by the user from among the plurality of lists on the second screen.

35. The apparatus as claimed in claim 29, wherein the control unit controls the generation unit to remove the plurality of items from the first screen if a command to execute an item from among the plurality of items is input, and to display an executing screen to execute the item on the first screen.

36. The apparatus as claimed in claim 35, wherein the control unit adds the item executing on the executing screen on the first screen to the selected list from among the plurality of lists on the second screen.

37. The apparatus as claimed in claim 29, wherein an item on the first screen belongs to both a first list and a second list on the second screen.

38. A method of providing a graphical user interface (GUI) on a display of a portable multimedia apparatus, the method comprising:
displaying first items of a list on a first screen of the display;
displaying second items on a second screen of the display, simultaneous to the display of the first items on the first screen;
moving a second item from the second screen to the first screen according to a manipulation of a user;
adding the moved second item to the list; and
deleting at least one of the first items from the first screen if the at least one of the first items is dragged to an outside of the display of the portable multimedia apparatus,
wherein the deleting of the at least one of the first items from the first screen also comprises deleting the second item added to the list.

39. The method as claimed in claim 38, wherein the manipulation of the user is a dragging and dropping of the second item from the second screen to the first screen.

40. The method as claimed in claim 39, wherein the display is a touch screen displaying the first screen and the second screen.

41. The method as claimed in claim 39, wherein the manipulation of the user is performed using an input unit that is provided separately from the display showing the first screen and the second screen.

42. The method as claimed in claim 38, wherein the moving of the second item comprises moving the second item to a location of the first screen on which the second item is dragged and dropped onto the first screen.

43. The method as claimed in claim 38, wherein the second items on the second screen do not belong to the list.

44. The method as claimed in claim 38, further comprising:
moving a first item from the first screen to the second screen; and
deleting the moved first item from the list.

45. The method as claimed in claim 38, further comprising:
moving a first item from a first location of the first screen to a second location of the first screen where the first item is dropped.

46. The method as claimed in claim 38, further comprising:
displaying text indicating an area on the first screen to which a second item can be moved to.

47. The method as claimed in claim 38, wherein the displaying of the second items on the second screen comprises displaying the second items on the second screen if the user touches a point on the display displaying the first screen and the second screen or if the user drags an area on the display.

48. The method as claimed in claim 38, further comprising removing the second items from the second screen if the user touches a point on the display displaying the first screen and the second screen or if the user drags an area on the display.

49. The method as claimed in claim 38, wherein the first and second items include moving image content, still image content, music content, text content, one or more menu items, and/or one or more widget items.

50. The method as claimed in claim 49, wherein the first items are text content and the second items are a portion of the text content that are the first items.

51. The method as claimed in claim 50, wherein the portion of the text content that is the second items is selected by the user from the first items, and dragged and dropped from the first screen onto the second screen by the user.

52. A computer readable recording medium encoded with the method of claim 38 and implemented by a computer.

53. A portable multimedia apparatus including a display to provide a graphical user interface (GUI), the multimedia apparatus comprising:
a generation unit to generate the GUI; and
a control unit to control the generation unit to generate the GUI such that first items belonging to a list are displayed on a first screen of the display, second items are simultaneously displayed on a second screen of the display, and a second item on the second screen is moved to the first screen according to a manipulation of a user and added to the list, and to delete at least one of the first items from the first screen if the at least one of the first items is dragged to an outside of the display of the portable multimedia apparatus,
wherein the deleting of the at least one of the first items from the first screen also comprises deleting the second item added to the list.

54. The apparatus as claimed in claim 53, wherein the manipulation of the user is a dragging and dropping of the second item from the second screen to the first screen.

55. The apparatus as claimed in claim 53, wherein the control unit controls the generation unit to generate the GUI such that the second item is moved to a dropped location on the first screen.

56. The apparatus as claimed in claim 53, wherein the second items on the second screen do not belong to the list on the first screen.

57. The apparatus as claimed in claim 53, wherein the control unit operates the generation unit to generate the GUI such that a first item is moved to the second screen according to another manipulation of the user and deleted from the list on the first screen.

58. A method of editing a graphical user interface (GUI) on a display of a portable multimedia apparatus, the method comprising:
displaying a plurality of main menu items of a main menu on a first editing screen of the display;
displaying a plurality of extra menu items, not on the main menu, on a second editing screen of the display, simultaneous to the displaying of the first editing screen;
adding an extra menu item selected by a user from among the plurality of extra menu items on the second screen to the main menu when the user moves the selected extra menu item from the second screen to the first screen; and
deleting at least one of the plurality of main menu items from the first editing screen if the at least one of the plurality of main menu items is dragged to an outside of the display of the portable multimedia apparatus,
wherein the deleting of the at least one of the plurality of main menu items from the first editing screen also comprises deleting the extra menu item added to the main menu.

59. The method as claimed in claim 58, further comprising removing, from the main menu, a main menu item selected by the user from among the plurality of main menu items on the first screen when the user moves the selected main menu item from the first screen to the second screen.

60. A computer readable recording medium encoded with the method of claim 58 and implemented by a computer.

* * * * *